US010507905B2

(12) United States Patent
Bihel et al.

(10) Patent No.: US 10,507,905 B2
(45) Date of Patent: Dec. 17, 2019

(54) ADAPTIVE FLIGHT CONTROL SYSTEM FOR THE YAW AND THRUST FLIGHT CONTROLS OF A HYBRID HELICOPTER

(71) Applicant: AIRBUS HELICOPTERS, Marignane (FR)

(72) Inventors: Jean-Romain Bihel, Le Rove (FR); Arnaud Groll, Calas (FR); Romuald Biest, Lauris (FR); Zouhair Sassi, Marseilles (FR)

(73) Assignee: AIRBUS HELICOPTERS, Marignane (FR)

(*) Notice: Subject to any disclaimer, the term of this patent is extended or adjusted under 35 U.S.C. 154(b) by 281 days.

(21) Appl. No.: 15/352,924

(22) Filed: Nov. 16, 2016

(65) Prior Publication Data

US 2017/0144747 A1    May 25, 2017

(30) Foreign Application Priority Data

Nov. 20, 2015 (FR) ...................... 15 02432

(51) Int. Cl.
*B64C 13/00*    (2006.01)
*B64C 27/02*    (2006.01)
(Continued)

(52) U.S. Cl.
CPC ............ *B64C 13/343* (2018.01); *B64C 11/36* (2013.01); *B64C 13/044* (2018.01);
(Continued)

(58) Field of Classification Search
CPC ......... B64C 27/22; B64C 13/30; B64C 13/24; B64C 27/26; B64C 27/57
(Continued)

(56) References Cited

U.S. PATENT DOCUMENTS 2,620,772 A * 12/1952 McLane .................. B64C 13/24
244/226
2,940,332 A * 6/1960 Teague, Jr. .............. B64C 13/24
244/228
(Continued)

FOREIGN PATENT DOCUMENTS

FR    1132452    3/1957
FR    2476013    8/1981
(Continued)

OTHER PUBLICATIONS

Russian Search Report for Russian Application No. 2016144292/11, dated Jan. 9, 2018, 2 pages.
(Continued)

*Primary Examiner* — Richard R. Green
*Assistant Examiner* — Steven J Shur
(74) *Attorney, Agent, or Firm* — Brooks Kushman P.C.

(57) ABSTRACT

An adaptive flight control system for controlling the pitch of blades of a propulsive propeller of a hybrid helicopter as a function of the return value of the pitch. The adaptive flight control system comprises control means supplying the pitch control order, a piloting member controlling variation of the pitch, and piloting means applying a control gain in order to transform the control order into a setpoint, and transmitting the setpoint to the piloting member. The piloting means include information return means applying a return gain that is variable to the return value of the variation of the pitch to the piloting means, also modifying the control gain as a function of the return value.

20 Claims, 3 Drawing Sheets

(51) Int. Cl.
 *B64C 13/28* (2006.01)
 *B64C 13/04* (2006.01)
 *B64D 31/04* (2006.01)
 *B64C 11/36* (2006.01)
 *B64C 13/12* (2006.01)
 *B64C 27/26* (2006.01)
 *B64C 27/28* (2006.01)
 *G05D 1/08* (2006.01)

(52) U.S. Cl.
 CPC .......... *B64C 13/0421* (2018.01); *B64C 13/12* (2013.01); *B64C 13/28* (2013.01); *B64C 27/26* (2013.01); *B64C 27/28* (2013.01); *B64D 31/04* (2013.01); *G05D 1/0858* (2013.01)

(58) Field of Classification Search
 USPC ........................................................ 244/195
 See application file for complete search history.

(56) References Cited

U.S. PATENT DOCUMENTS

| | | | | |
|---|---|---|---|---|
| 4,385,741 | A * | 5/1983 | Mootz | B64C 13/30 |
| | | | | 244/230 |
| 6,913,226 | B2 * | 7/2005 | Huynh | B64C 13/30 |
| | | | | 244/75.1 |
| 8,376,266 | B2 | 2/2013 | Gemmati et al. | |
| 8,655,510 | B2 | 2/2014 | Eglin | |
| 8,840,057 | B2 * | 9/2014 | Moret | B64C 27/12 |
| | | | | 244/6 |
| 8,967,524 | B2 | 3/2015 | Leclercq et al. | |
| 9,126,678 | B2 * | 9/2015 | Ross | B64C 29/0075 |
| 2013/0175385 | A1 | 7/2013 | Eglin | |

FOREIGN PATENT DOCUMENTS

| | | |
|---|---|---|
| FR | 2946316 | 12/2010 |
| FR | 2992696 | 1/2014 |
| RU | 2513189 C2 | 4/2014 |
| RU | 2525357 C2 | 8/2014 |

OTHER PUBLICATIONS

French Search Report for French Application No. FR 1502432, Completed by the French Patent Office, dated Aug. 9, 2016, 7 Pages.

* cited by examiner

ADAPTIVE FLIGHT CONTROL SYSTEM FOR THE YAW AND THRUST FLIGHT CONTROLS OF A HYBRID HELICOPTER

CROSS REFERENCE TO RELATED APPLICATION

This application claims priority to French patent application No. FR 15 02432 filed on Nov. 20, 2015, the disclosure of which is incorporated in its entirety by reference herein.

BACKGROUND OF THE INVENTION (1) Field of the Invention

The present invention lies in the field of aircraft flight controls. It relates to an adaptive flight control system for an aircraft and to an aircraft fitted with such an adaptive flight control system.

More particularly, the present invention is for a hybrid helicopter and it relates to an adaptive flight control system for piloting the pitch of blades of propulsive propellers of said hybrid helicopter.

(2) Description of Related Art

The term "hybrid helicopter" is used to designate an aircraft that combines the vertical flight effectiveness of a conventional rotary wing aircraft with the high-speed performance made possible by using propulsive propellers.

A conventional rotary wing aircraft has a fuselage and at least one main rotor driven in rotation by a power plant of the aircraft so as do provide both lift and propulsion when the rotorcraft is of the helicopter type. Such an aircraft generally includes an anti-torque device that opposes the rotor torque due to the reaction of the main rotor of the rotorcraft to the driving torque used for setting the main rotor into rotation. The rotor torque tends to cause the fuselage of the aircraft to turn in yaw in the opposite direction to the rotation of the main rotor. The anti-torque device also enables the aircraft to be piloted about its yaw axis, which is substantially parallel to the axis of rotation of the main rotor.

An anti-torque device is often constituted by an auxiliary rotor that is generally situated at the rear of the aircraft, at the end of a tail boom of the aircraft, and it is driven in rotation by the power plant of the aircraft by means of an auxiliary mechanical power transmission system.

A hybrid helicopter has a fuselage, and a main rotor driven in rotation by a power plant of the hybrid helicopter. The hybrid helicopter is also provided with a wing made up of two half-wings and with two propulsive propellers that are placed on either side of the fuselage, e.g. on respective half-wings. The propulsive propellers are driven in rotation by the power plant of the hybrid helicopter.

The main rotor serves to provide the hybrid helicopter with all of its lift during stages of takeoff, landing, and hovering flight, and generally with part of its lift during cruising flight, with the wing then also contributing part of the lift of the hybrid helicopter. Thus, the main rotor provides a hybrid helicopter in cruising flight with part of its lift and possibly also with a small contribution to its propulsion or traction forces, and it does so with minimized drag.

The propulsion of a hybrid helicopter in cruising flight is then provided mainly by its propulsive propellers. Specifically, by modifying the pitch of the blades of the propellers of a hybrid helicopter collectively by the same amount, it is possible to control the thrust generated by the propulsive propellers, and consequently to control its speed of advance.

It should be observed that the pitch of the propellers of a propulsive propeller can be varied in collective manner only, unlike the blades of a main rotor of a rotary wing aircraft in which the pitch can be varied both in collective manner and in cyclic manner. Consequently, and for simplification purposes, the term "pitch" is used below in the description to designate the "collective pitch" of the blades of a propulsive propeller.

Furthermore, the anti-torque and yaw control functions of a hybrid helicopter are implemented by using differential thrust exerted in general by the two propulsive propellers, e.g. by the pilot making use of rudder pedals.

For this purpose, the pitches of the blades of the two propulsive propellers depart from a mean value, the pitch of the blades of one propeller increasing by a differential pitch and the pitch of the blades of the other propeller decreasing by the same differential pitch. The pitch of one propeller is thus equal to the sum of the mean pitch plus the differential pitch, while the pitch of the other propeller is equal to the difference of the mean pitch minus the differential pitch. In other words, the differential pitch is equal to half of the difference in pitch of one propeller minus the pitch of the other propeller, for example.

The flight controls of a rotary wing aircraft include a cyclic pitch control stick enabling the pilot to modify the cyclic pitch of the blades of the main rotor in order to control the aircraft in pitching and in roll. A collective pitch control lever enables the pilot to modify the collective pitch of the blades of the main rotor in order to control the aircraft in elevation. Rudder pedals enable the pilot to act on the anti-torque device in order to control the aircraft in yaw. If the anti-torque device is an auxiliary rotor, the rudder pedals serve to modify the collective pitch of the blades of the auxiliary rotor. With a hybrid helicopter, the rudder pedals serve to modify the pitch of the blades of each of the two propulsive propellers in differential manner.

Furthermore, a hybrid helicopter generally includes an additional flight control constituted by a thrust lever for the propulsive propellers. The thrust lever enables the pilot to modify the pitch of the blades of both propellers in identical manner in order to modify the speed of advance of the hybrid helicopter.

Furthermore, the flight controls are generally connected to the various blades via mechanical connections referred to as "mechanical linkages" or merely as "linkages, and possibly via servo-controls, in particular on aircraft of large size for which control forces are greater.

Each mechanical linkage applies a transmission ratio, which is also known as its "gain", between the flight control order from the pilot on the flight control and the corresponding variation in the pitch of the blades. The gain may be different for any one flight control, but it is generally constant for each flight control on a conventional rotary wing aircraft.

Nevertheless, it may be useful for the gain to be modified for certain flight controls depending on the flight conditions of the aircraft, and this applies in particular for the yaw flight control in a hybrid helicopter.

For example, when an aircraft has a high speed of advance, it is known that moving the rudder pedals through large control amplitudes can lead to maneuvers that generate large mechanical stresses on the aircraft and/or that cause the aircraft to yaw violently or even dangerously about its yaw axis. This risk, which is well known for airplanes, is just as real for hybrid helicopters having speeds of advance during cruising flight that are considerably greater than the speeds of advance of conventional rotary wing aircraft.

In order to reduce this risk, the mechanical linkage for controlling flight in yaw and corresponding to the rudder pedals may include a mixing unit. A mixing unit is a mechanical device in which, by way of example, an order from a flight control is superposed on a value of a flight parameter, or indeed in which two orders coming from distinct flight controls are superposed.

By way of example, a mixing unit may seek to modify the amplitude of a flight control depending on the speed of advance of the aircraft, as described in Document FR 2 476 013. Such a mixing unit thus enables a controlled member of an airplane, such as an elevator or a rudder, to perform a large movement at a low speed of advance, while reducing the amplitude of that movement at a high speed of advance. The mixing unit then has an adjustment member that moves as a function of a signal delivered by the dynamic air pressure on the aircraft and limits the movement of a link in the mechanical linkage of the flight control to a greater or lesser extent. The gain of the mechanical linkage for the flight control is itself constant.

A mixing unit may also modify the gain that is applied by the mechanical linkage of a flight control depending on the speed of advance of the aircraft, as described in Document FR 1 132 452. Such a mixing unit thus makes it possible for an identical movement of the flight control to give rise to different movements of a controlled member as a function of the speed of advance of the aircraft. The mixing unit has a pin belonging to a mechanical linkage of the flight control of an aircraft, and the position of the pin is modified as a function of the speed of advance of the aircraft. A change in the position of the pin serves to modify the gain of the mechanical linkage.

In addition, Document U.S. Pat. No. 2,940,332 is known, which describes a flight control system that applies variable gain to a flight control order. Gain is varied by means of an actuator deforming a parallelogram made up of links and arranged in the mechanical linkage of the flight control. The actuator can be controlled by an external setpoint associated with conditions of flight, such as the altitude or indeed the speed of the aircraft.

Although advantageous, those solutions appear to be poorly adapted to the very particular context of a hybrid helicopter, in particular because of their limitations in terms of variable gain and of lack of accuracy on the flight control output.

Furthermore, Document FR 2 946 316 is known, which relates to a hybrid helicopter and describes a mixing unit that modifies the gain applied by the mechanical linkage of a yaw flight control in compliance with the collective thrust control order for the propulsive propellers. That mixing unit includes adjustment means comprising pulleys and a belt connected to the thrust control for the propulsive propellers. That thrust control for the propulsive propellers constitutes a reliable and robust indicator of the speed of advance of the hybrid helicopter in flight relative to the air.

Specifically, an action of a pilot on the thrust control causes the belt to move and modifies the length of a lever arm in the yaw flight control mechanical linkage, thereby varying the gain of that yaw flight control mechanical linkage. Furthermore, that Document FR 2 946 316 also describes a mixing/coupling unit that enables a correction term to be added to the yaw flight control as a function of the thrust control order for the propulsive propellers. However, those mixing units are complex in terms of operation and installation. Furthermore, that mixing unit takes account of the value of the collective thrust control issued by the pilot solely for the purpose of varying the gain of the yaw control linkage. The variable gain is therefore not applied to controlling the collective thrust of the propulsive propellers. In addition, those adjustment means comprising pulleys and a belt are limited in terms of range and variation of gain and also give rise to losses of accuracy in the control output.

Furthermore, the rudder pedals, constituting the yaw flight control of a hybrid helicopter, and the thrust lever for the propulsive propellers act jointly on controlling variation of the pitch of the blades of the two propulsive propellers.

This variation in the pitch of the blades of the propulsive propellers is generally controlled initially by means of first specific linkages connected respectively to the rudder pedals and to the thrust lever, and then by two second linkages, each second linkage being connected to one of the propulsive propellers. Grouping means then serve to group the first linkages together and then to actuate the second linkages. The pitch of the blades of the propulsive propellers is then varied identically if the flight control order comes from the thrust lever. Variation is controlled differentially if the flight control order comes from the rudder pedals.

Each second linkage generally acts mechanically to control variation in the pitch of the blades of one of the propulsive propellers, e.g. by moving in translation a tube that is coaxial about the shaft for driving the blades of the propulsive propeller in rotation.

Each second linkage may also act hydraulically to control this variation in the pitch of the blades of a propulsive propeller, as described in Document FR 2 992 696. Each second linkage controls a hydraulic distributor and a hydraulic fluid, such as oil, flows inside a jacket in order to feed an actuator that generates the pitch variation. In addition, that jacket may contain the shaft for driving the blades of the propulsive propeller in rotation, which propeller may also be movable in translation along its axis of rotation as well as being movable in rotation. Furthermore, the drive shaft, which is at least partially inside the jacket, is thus at least partially surrounded by the fluid.

Finally, the technological background of the invention includes amongst other documents U.S. Pat. No. 2,620,772, which describes a variable-ratio force-amplification device for a flight control.

BRIEF SUMMARY OF THE INVENTION

An object of the present invention is thus to provide an adaptive flight control system for an aircraft enabling the above-mentioned limitations to be overcome in order to control in simple and reliable manner a flight member while applying variable gain to the return value of said flight control as a function of the value of said return value. The term "return value" is used to mean information about the current value of this flight control as actually applied by the flight member.

In particular, an object of the present invention is to provide an adaptive flight control system for piloting the pitch of the blades of each propulsive propeller of a hybrid helicopter.

According to the invention, an adaptive flight control system for an aircraft for modifying the return gain applied to the return value of the flight control comprises:

control means supplying a flight control order via a first movement of the control means;

a piloting member for controlling a flight member of the aircraft;

piloting means including a control link and applying control gain in order to transform the flight control order into a flight control setpoint and transmitting the flight control setpoint to action means via a second movement of the control link;

the action means transforming the flight control setpoint into a flight control action and applying this flight control action to the piloting member; and information return means supplying a return value of the flight control to the piloting means.

This adaptive flight control system of the invention is remarkable in that the information return means apply a variable return gain to the return value of the flight control, this return gain being variable as a function of the return value of the flight control.

The adaptive flight control system is particularly for use on rotary wing aircraft and more particularly on hybrid helicopters comprising a fuselage, at least one main rotor having first blades, and at least two propulsive propellers positioned on either side of the fuselage. The propulsive propellers are provided with second blades and, by way of example, they are positioned on respective half-wings placed on either side of the fuselage. The pitch of the second blades of each propulsive propeller can be modified in order to modify the thrust generated by the propulsive propeller.

An adaptive flight control system of the invention is then positioned between a flight control mechanical linkage piloting a flight member, and the flight member.

The adaptive flight control system is adapted to piloting the pitch of the second blades of each propulsive propeller of such a hybrid helicopter. A variation in this pitch of the second blades of these propulsive propellers may be controlled on a hybrid helicopter both by rudder pedals that modify the pitch of the second blades of each of the propulsive propellers in differential manner, and also by a thrust lever for the propulsive propellers that modifies the pitch of the propulsive propellers in identical manner. Thus, an adaptive flight control system makes it possible, for each propulsive propeller, to modify the return gain that is applied to the return value of the pitch of the second blades of that propulsive propeller as a function of its return value.

An adaptive flight control system is then positioned between the mechanical linkages of the rudder pedals and of the thrust lever for the propulsive propellers and each propulsive propeller of the hybrid helicopter.

The control means form part of a flight control mechanical linkage and they supply a flight control order in the form of a first movement of the control means. The control means are situated at the end of the flight control mechanical linkage and, by way of example, they are constituted by the last element of the linkage. The control means could equally well be constituted by the end of a ball bearing control or "ball-bearing sheath" and may include one or more rows of rolling members.

It should be observed that such a flight control mechanical linkage may incorporate gain between the control order issued by the pilot of the aircraft and the control order transmitted by the control means. This gain is fixed and constant.

The control means are preferably elongate in shape, such as a tube or a bar, extending along an axis D. The first movement of the control means is then generally a movement in translation substantially parallel to the axis D.

For piloting the pitch of the second blades of the propulsive propellers of such a hybrid helicopter, the control means are situated at the end of the mechanical linkage for controlling the pitch of the second blades of each propulsive propeller. The control means transmit both the flight control orders from the rudder pedals and the flight control orders from the thrust lever for the propulsive propellers.

The piloting means transform the first movement of the control means into a second movement of the control link, the second movement constituting the flight control setpoint. This transformation is performed by applying a control gain to the flight control order, e.g. by means of yokes having lever arms of different lengths. The second movement of the control link is equal to the product of the control gain multiplied by the first movement of the control means.

The action means transform this flight control setpoint into a flight control action, and they apply this flight control action to a piloting member.

The piloting member serves to pilot the flight member of the aircraft to which the flight control order applies. By way of example, this flight member is piloted by this piloting member moving in translation or in turning.

In order to pilot the pitch of the second blades of the propulsive propellers of a hybrid helicopter, a flight member modifies the pitch of the second blades of a propulsive propeller. In this context, the piloting member may comprise a tube that is coaxial about the shaft for driving the second blades of the propulsive propeller in rotation, the tube being moved in translation, e.g. parallel to the axis of rotation of the drive shaft in order to modify the pitch.

The movement in translation of the tube may be controlled mechanically, the piloting member being a mechanical device. The action means are then a mechanical system transforming the second movement of the control link into a movement in translation that is transmitted to the tube of the piloting member.

The tube may also be moved in translation under hydraulic control, the piloting member being a hydraulic device controlling this variation in the pitch of the second blades of a propulsive propeller, as described in Document FR 2 992 696. The action means are then a hydraulic system powering the hydraulic device and controlled by the control link. By way of example, the hydraulic system is a hydraulic distributor.

Finally, the information return means supply the piloting means with a return value of the flight control corresponding to the current value of the flight control as actually applied by the flight member. By way of example, the information return means may use the tube of the piloting member in order to define the return value of the flight control, this return value then being transmitted mechanically via a system of links to the piloting means. The information return means may also be referred to as "return means".

The piloting means thus take account of this return value of the flight control in order to regulate the operation of the action means piloting the flight member so that the flight member applies the flight control order.

The information return means advantageously apply variable return gain to the return value of the flight control in order to supply the piloting means with information that differs as a function of the return value of the flight control.

For this purpose, the information return means comprise transfer means and a transfer link. The transfer means are connected to the piloting member and possess at least one degree of freedom. The piloting member thus transmits at least one of its movements to the transfer means, thereby generating a third movement of the transfer means.

By way of example, the transfer means may be secured to the piloting member, with the transfer means then possessing the same capabilities for movement as the piloting member. Specifically, it is assumed that two elements are secured to each other when they are connected together rigidly and are thus subjected to the same movements.

Preferably, the transfer means have only one degree of freedom. By way of example, the transfer means possess only the ability to move in translation, with the third movement being transmitted in translation by the piloting member. The transfer means may alternatively possess only the ability to move in pivoting, the third movement being transmitted in pivoting by the piloting member.

The transfer means may then be secured to the piloting member when the piloting member possesses only one degree of freedom in movement.

When the piloting member possesses at least two degrees of freedom in movement, the transfer means are then connected to the piloting member by a first mechanical connection. The first mechanical connection transmits the third movement to the transfer means while allowing relative movement between the transfer means and the piloting member.

For example, when the piloting member possesses two degrees of freedom in movement, namely a movement in translation and a movement in rotation, the first mechanical connection is a pivot connection while the transfer means are free to move only in translation.

The transfer means are connected to the transfer link by a second mechanical connection. The third movement of the transfer means can then give rise to a fourth movement of the transfer link via the second mechanical connection. This fourth movement of the transfer link may be a movement in translation or in pivoting. The transfer means then apply the return gain to the return value of the flight control by transforming the third movement of the transfer means into a fourth movement of the transfer link.

The second mechanical connection may be formed by a groove presented by the transfer means and by a peg forming part of the transfer link. The peg is situated in the groove, the third movement of the transfer means then being capable of giving rise to a movement of the peg in the groove, and consequently to the fourth movement of the transfer link.

This groove may be formed by a plurality of successive straight-line segments of different slopes on the transfer means as a whole. Under such circumstances, the information return means advantageously apply a variable return gain to the return value of the flight control over the transfer means as a whole. Specifically, the return gain is constant so long as the peg lies in the same straight-line segment of the groove, but the return gain varies when the peg changes segment in the groove. The return gain is proportional to the slope of the groove in which the peg is situated. Advantageously, this return gain varies as a function of the return value of the flight control.

This groove may also be formed by a curve over the transfer means as a whole. Under such circumstances, the return gain varies continuously depending on the position of the peg in the groove.

Thus, the movement of the peg in the groove gives rise to variation in the return gain when the peg changes slope in the groove or when the peg moves in a groove that is curved.

As a result, the return value of the flight control supplied by the information return means to the piloting means can be weighted as a function of the return gain and thus as a function of the current value of the flight control as actually applied by the flight member. The way the operation of the action means piloting the flight member are regulated can thus be adapted as a function of the return gain and thus as a function of the current value of the flight control as actually applied by the flight member.

It should be observed that if the groove is constituted by a single straight-line segment, i.e. having only one slope, over the transfer means as a whole, then the information return means would apply a constant return gain to the return value of the flight control.

The information return means then provide the piloting means with the return value of the flight control to which the return gain has been applied, so as to regulate the action means piloting the flight member in compliance with the flight control order and this return value of the flight control to which the return gain has been applied.

The piloting means comprise a first yoke connected to the transfer link and a second yoke connected to the first yoke, to the control means, and to the control link. Since the transfer link is connected to the first yoke, the fourth movement of the transfer link then gives rise to a fifth movement of the first yoke.

The transfer link may be connected to the first yoke by a third mechanical connection, which then transforms the fourth movement of the transfer link into a fifth movement of the first yoke.

Preferably, the transfer link is secured to the first yoke. For example, the fourth movement of the transfer link and the fifth movement of the first yoke may be piloting movements about a common pivot axis.

The second yoke is connected to the first yoke by a first pivot connection and to the control means by a second pivot connection. The control link may be secured to the second yoke. Preferably, the control link is connected to the second yoke by a third pivot connection.

The first movement of the control means representing the flight control order then gives rise to the second yoke pivoting about the first pivot connection, and consequently to the second movement of the control link.

A first lever arm is defined by a first distance between the first pivot connection and the second pivot connection, this first distance being defined perpendicularly to the axis D. A second lever arm is defined by a second distance between the first pivot connection and the third pivot connection, this second distance also being defined perpendicularly to the axis D. When the control link is secured to the second yoke, the second lever arm is defined by a second distance between the first pivot connection and the point at which the control link is fastened to the second yoke.

The control gain applied by the piloting means is then equal to the ratio between the second distance and the first distance.

In addition, the first pivot connection is subjected to the fifth movement of the first yoke and thus gives rise to a sixth movement of the second yoke. Specifically, the sixth movement of the second yoke gives rise to an additional movement of the control link. This additional movement of the control link is combined with the second movement of the control link so as to modify the flight control setpoint, thereby regulating the operation of the action means piloting the flight member. Generally, this additional movement of the control link, which is a function of the return value of the flight control after the return gain has been applied thereto, opposes the second movement of the control link when the flight control comes close to applying the flight control order.

Furthermore, the fifth movement of the first yoke and the sixth movement of the second yoke lead to a change in the first and second distances, while the axis D remains substantially unchanged. Consequently, the control gain applied by the piloting means to the flight control order is modified. This modification to the control gain is thus performed as a function of the value of the fifth movement of the first yoke, which is itself a function of the return value of the flight control to which the return gain has been applied.

The control gain is applied to the flight control order supplied by the control means and it is modified by the information return means. The control gain is thus advantageously variable as a function of the return value of the flight control, which corresponds to the current value of the flight control as actually applied by the flight member, and not as a function of the movement of the control means.

Furthermore, the return gain applied to this return value of the flight control is also variable as a function of the return value from the information return means. This return value of the flight control can thus be decreased or else amplified in order to be transmitted to the piloting means.

Thus, the movement of the control link piloting the action means is defined by applying firstly the control gain to the flight control order and secondly the return gain to the return value of the flight control, the control gain and the return gain being variable as a function of the current value of the flight control as actually applied by the flight member.

Advantageously, the application of the control gain and of the return gain and also the piloting of variations in these gains are situated at the end of the flight control mechanical linkage, directly in association with the action means and the piloting member of the flight member, unlike existing devices, and in particular those described in Documents FR 1 132 452 and FR 2 946 316. Specifically, the flight control mechanical linkage, situated upstream from the application of these gains and of the piloting of their variations, moves by a relatively large amount, with the control gain generally being less than one. However, in existing devices, the application of the gains and the piloting of the gains take place upstream from the piloting member, and more precisely on the flight control mechanical linkage. Consequently, the movement of the mechanical linkage is relatively large upstream and considerably reduced downstream from this application of these gains and/or the piloting of variations in them.

Thus, the adaptive flight control system of the invention is disturbed little or not at all by dispersion or inaccuracies associated in the flight control mechanical linkage. Specifically, such dispersion or inaccuracies, which are constituted by small movements or deformations, have only negligible effects on the movements of the mechanical linkage, since those movements are relatively large. Such dispersion or inaccuracies may for example be due to the great length of the mechanical linkage and to the expansions to which it might be subjected.

Likewise, since the movements of the flight control mechanical linkage are relatively large, this mechanical linkage remains relatively lightly loaded in terms of force. As a result, its dimensions and its weight can be optimized.

Finally, applying these gains and piloting variations in them can give rise to friction in the flight control mechanical linkage, thereby increasing the control forces on the flight control mechanical linkage. Advantageously, applying these control and return gains and piloting variations in them all take place at the piloting member for piloting the flight member, and thus they add no friction force, nor any force interfering with the flight control mechanical linkage.

The friction forces associated with applying the control and return gains and the piloting of variations in those gains on the adaptive flight control system of the invention appear at the transfer means, with movement thereof being generated directly by the flight member. These friction forces are thus negligible compared with the capabilities of the piloting member, which may for example be a hydraulic device.

Furthermore, the dynamics of the piloting means of the adaptive flight control system of the invention advantageously guarantee that there is no significant coupling of the control means with the control gain or with the return gain. Thus, a first movement of the control means gives rise to no variation in the control gain and to no variation in the return gain. As a result, the control gain and the return gain are independent and insensitive to any action of the control means, i.e. to any action on the rudder pedals or on the thrust lever for the propulsive propellers.

Furthermore, the adaptive flight control system of the invention is a system that is entirely mechanical, and possibly hydraulic for the action means and for the piloting member, thus ensuring reliability. Nevertheless, the reliability of the first, second, and third mechanical connections must be guaranteed, and in particular there must be no risk of seizing or blocking in order to obtain the certifications needed for enabling the adaptive flight control system to be installed on board an aircraft.

To this end, the first mechanical connection and the second mechanical connection can then be situated inside a zone that is lubricated in permanent manner. Advantageously, the information return means, and in particular the transfer means and the transfer link, are then situated at least in part in such a zone and lubricated in permanent manner. The first mechanical connection and the second mechanical connection are thus lubricated in permanent manner, without requiring the presence of a dedicated lubrication system. Furthermore, the transfer link is implanted securely with the first yoke so as to eliminate the third mechanical connection and any associated risk of seizing or blocking.

The reliability of the information return means is thus guaranteed so as to be able to obtain the certifications needed to enable the adaptive flight control system to be installed on board an aircraft.

For example, the information return means may be situated in a power transmission box of a propulsive propeller and may use the lubrication device of that transmission box.

Furthermore, the adaptive flight control system of the invention, when used for piloting the pitch of the second blades of a propulsive propeller of a hybrid helicopter, makes it possible advantageously to modify both the control gain applied to a first order from the rudder pedals and to a second order from the thrust lever for the propulsive propellers, and also the return gain applied to the return value of the pitch of the second blades of said propulsive propeller, as a function of said return value. This return value, which represents the thrust generated by the propulsive propeller, is a reliable and robust indicator of the speed of advance of the hybrid helicopter. The adaptive flight control system thus makes it possible to vary the control gain and the return gain depending on the speed of advance of the hybrid helicopter, and in particular makes it possible to modify these gains when the speed of advance is high.

At high speeds of advance, the adaptive flight control system of the invention thus makes it possible to reduce the pilot's authority over the flight controls, and in particular over the rudder pedals and the thrust lever, thereby minimizing the actions of those controls on the behavior of the aircraft. Thus, by way of example, a given flight control order transmitted by the control means may generate a variation in the pitch of the blades of a propulsive propeller that is greater at a low speed of advance than at high speed. Thus, the adaptive flight control system of the invention provides great control authority during hovering flight so as to guarantee that the aircraft is maneuverable, while limiting control authority during cruising flight so as to guarantee flight stability regardless of the actions of the pilot and thus avoid any excess torque on the mechanical linkages of the propulsive propellers.

For this purpose, the return gain may for example be increased considerably when the speed of advance is high so as to limit the effect of a first movement of the control means on the behavior of the aircraft, and consequently limit the pilot's authority over these flight controls.

Advantageously, while the hybrid helicopter is traveling at high speed, an action of the pilot on the rudder pedals or on the thrust lever for the propulsive propellers then does not give rise to any rapid variation in the pitch of the second blades of each propulsive propeller. The variations in the control gain and in the return gain are then the same for yaw movements of the aircraft and for changes to the thrust generated by the propulsive propellers.

Thus, an action on the rudder pedals then does not give rise to maneuvers of the aircraft about its yaw axis that are sudden or even uncontrollable, nor does it lead to damage of the aerodynamic elements of the aircraft.

Likewise, an action of the pilot on the thrust lever for the propulsive propellers then does not lead to damage to the propulsive propellers or to the mechanical transmission system of the propulsive propellers.

Specifically, without the adaptive flight control system, an action of the pilot on the thrust lever for the propulsive propellers at high speed could lead, for example, to a drop in the thrust generated by the propulsive propellers without the speed of advance of the aircraft. As a result, the airstream generated by the fast advance of the aircraft would lead to the rotation of the second blades of the propulsive propellers accelerating and that would then lead to an acceleration in the mechanical transmission system of those propulsive propellers. Excess torque could then appear in the mechanical transmission systems of the propulsive propellers and could lead to accelerating wear in the mechanical transmission system, or even to the sudden appearance of failures and/or mechanical breaks.

Consequently, the flight of the hybrid helicopter can take place in a manner that is safer, without those risks, as a result of using the adaptive flight control system of the invention.

It should be observed that the minimum and maximum control gains and the minimum and maximum return gains are determined by conventional tests as a function of the characteristics of the aircraft and as a function of simulations serving to test various configurations, the person skilled in the art being capable of optimizing the values and the variations in these maximum and minimum gains.

For example, the variation in the return gain is about 500% between the minimum and maximum gains, while the control gain is substantially constant. The variation in the return gain is the important factor for enabling the flight control order for a flight member to be adapted to the current value of the flight control as actually applied by the flight member.

Preferably, the control gain is substantially constant or varies very little, while the variation in the return gain is large.

In addition, the movement of the control link piloting the action means may be limited by the presence of abutments. These abutments enable the amplitude of the control applied to the action means to be limited and consequently they make it possible to avoid the flight control applied to the flight member varying too quickly.

The present invention also provides a power transmission system for a propulsive propeller comprising an adaptive flight control system as described above and a power transmission box of a propulsive propeller.

The information return means are preferably situated inside the power transmission box of a propulsive propeller so that the information return means are lubricated in permanent manner.

The present invention also provides a rotary wing aircraft having at least one flight member, at least one flight control, and at least one flight control mechanical linkage piloting a flight member together with at least one power transmission system for a propulsive propeller as described above and positioned between a flight control mechanical linkage and the corresponding flight member.

The aircraft is in particular a hybrid helicopter having a fuselage, at least one main rotor provided with first blades, and at least two propulsive propellers positioned on either side of the fuselage and provided with second blades. A power transmission system of a propulsive propeller is positioned between each mechanical linkage for controlling the pitch of the second blades of a propulsive propeller and said propulsive propeller.

For the hybrid helicopter, a first flight control comprises rudder pedals for controlling yaw flight of the aircraft serving to control the pitch of the second blades of the propulsive propellers differentially, and a second flight control is a thrust lever for the propulsive propellers serving to control the pitch of the second blades of each of the propulsive propellers in identical manner. The first and second flight controls act jointly on the control means of the adaptive flight control system of each power transmission system of a propulsive propeller.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which.

Elements that are present in more than one of the figures are given the same references in each of them.

DETAILED DESCRIPTION OF THE INVENTION

Figure 1:
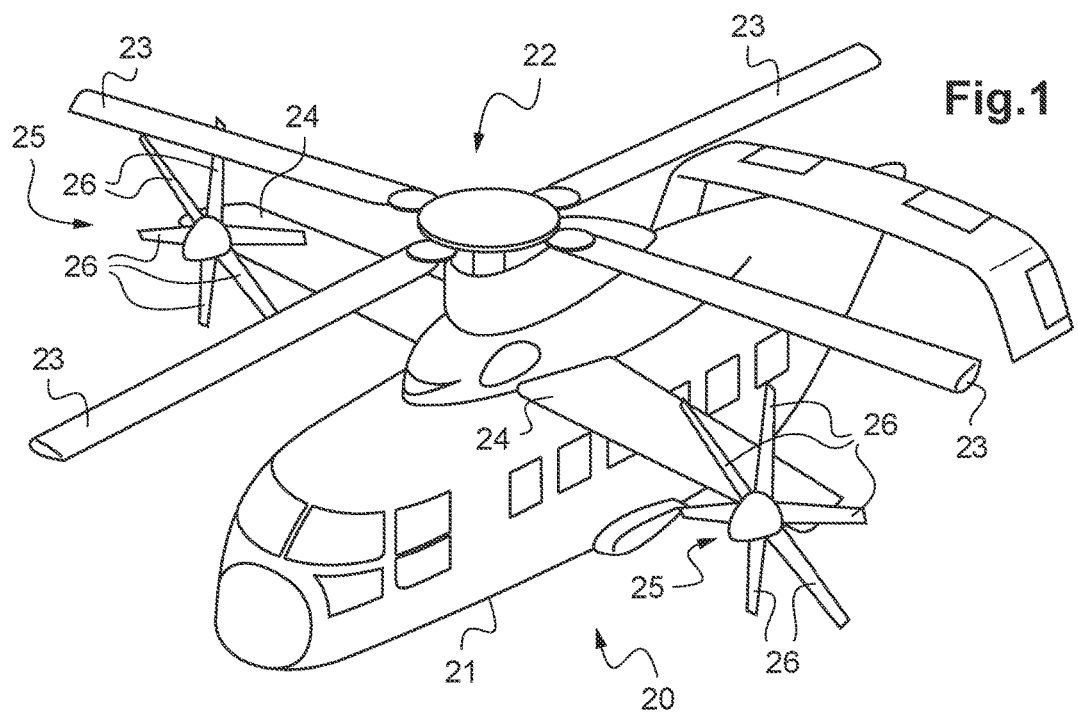
FIG. 1 shows a hybrid helicopter.

FIG. 1 shows an aircraft 20 of the hybrid helicopter type comprising a fuselage 21, a main rotor 22 having first blades 23, two half-wings 24 positioned on either side of the fuselage 21, and two propulsive propellers 25 having second blades 26. One propulsive propeller 25 is positioned on each half-wing 24.

The main rotor 22 provides the hybrid helicopter 20 with all of its lift during stages of takeoff, landing, and vertical flight, and it also provides it with the ability to move about its pitching and roll axes. During cruising flight, lift is shared between the main rotor 22 and the half-wings 24.

The hybrid helicopter 20 is propelled mainly by the propulsive propellers 25, particularly in cruising flight, possibly with a contribution from the main rotor 22. Each propulsive propeller 25 generates thrust that can be varied by varying the pitch of its second blades 26 in order to control the speed of advance of the hybrid helicopter 20.

In addition, the propulsive propellers 25 also perform the anti-torque and yaw-control functions of the hybrid helicopter 20, by means of a thrust differential between these propulsive propellers 25.

The hybrid helicopter 20 has a first flight control in the form of rudder pedals 31 enabling the pilot to control movements of the hybrid helicopter 20 about its yaw axis by differentially modifying the pitches of the second blades 26 of the two propulsive propellers 25.

The hybrid helicopter 20 also has a second flight control that is a thrust lever 33 for the propulsive propellers 25, enabling the pilot to modify the pitches of the second blades 26 of both propulsive propellers 25 in identical manner in order to modify the speed of advance of the hybrid helicopter 20.

Figure 2:
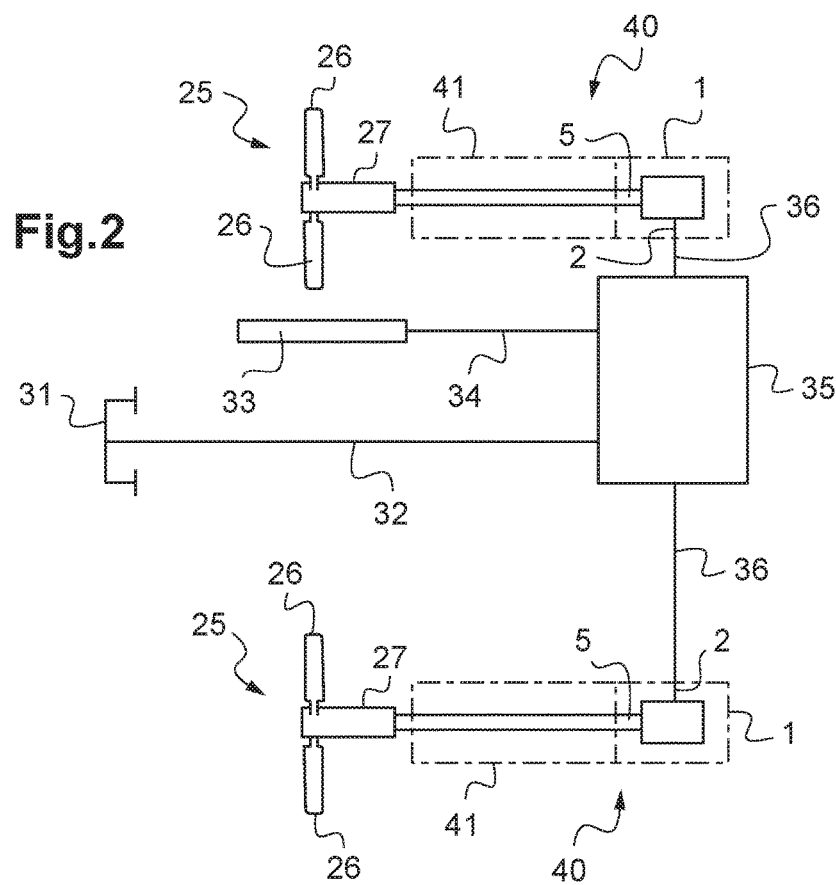
FIG. 2 is a diagram of the control architecture for varying the pitch of the second blades of the propulsive propellers.

As shown in FIG. 2, the rudder pedals 31 and the thrust lever 33 are connected to respective primary mechanical control linkages 32 and 34. The two primary mechanical linkages 32 and 34 are connected to two secondary mechanical linkages 36 via grouping means 35 in order to act jointly to control variation in the pitches of the second blades 26 of each of the propulsive propellers 25 via respective flight members 27.

Figure 3:
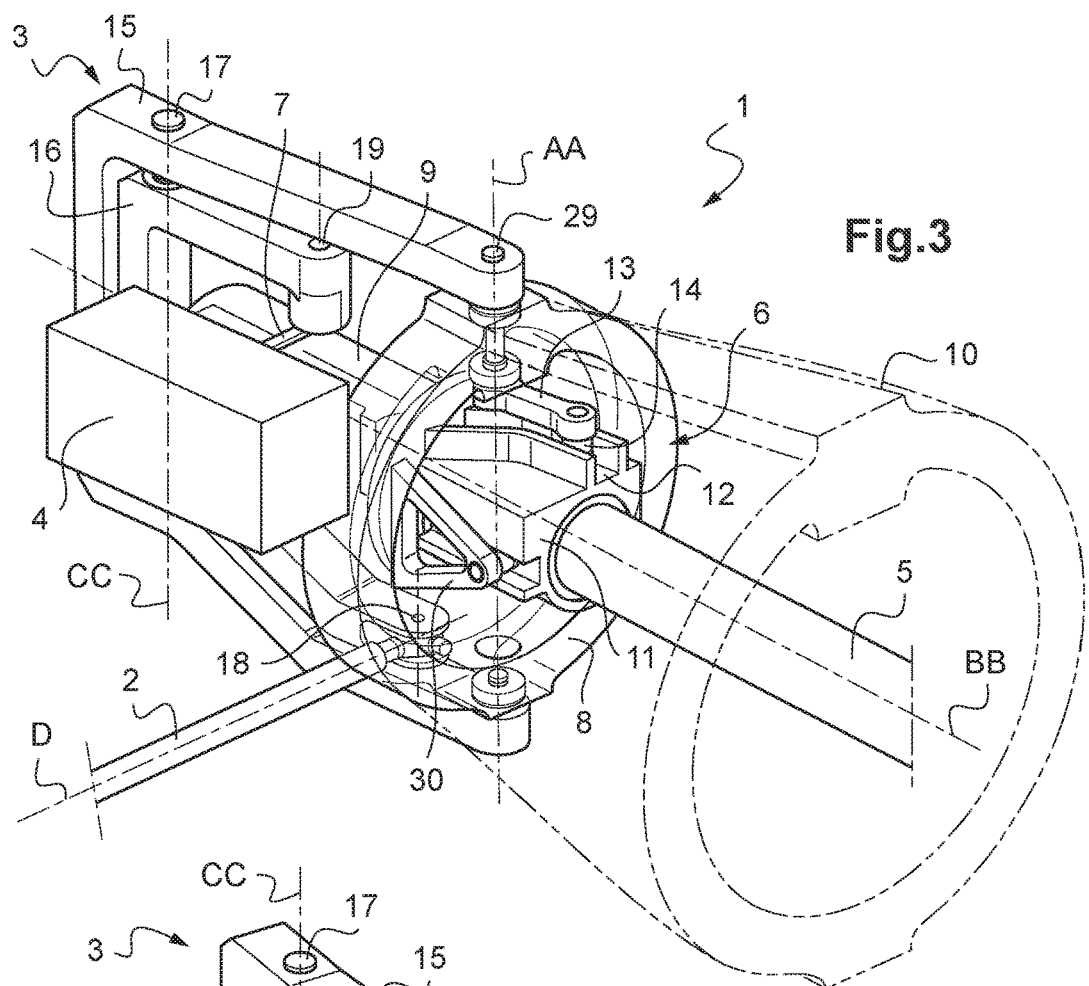
FIGS. 3 and 4 are perspective views of an adaptive flight control system of the invention.
Figure 4:
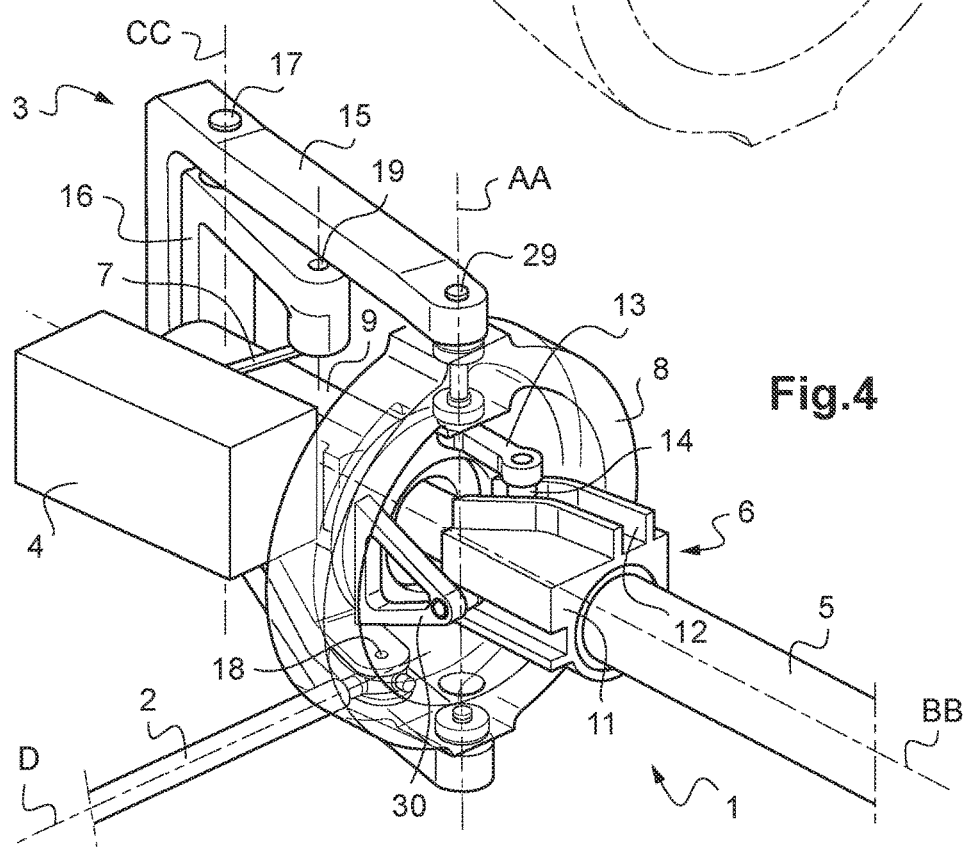
Figure 5:
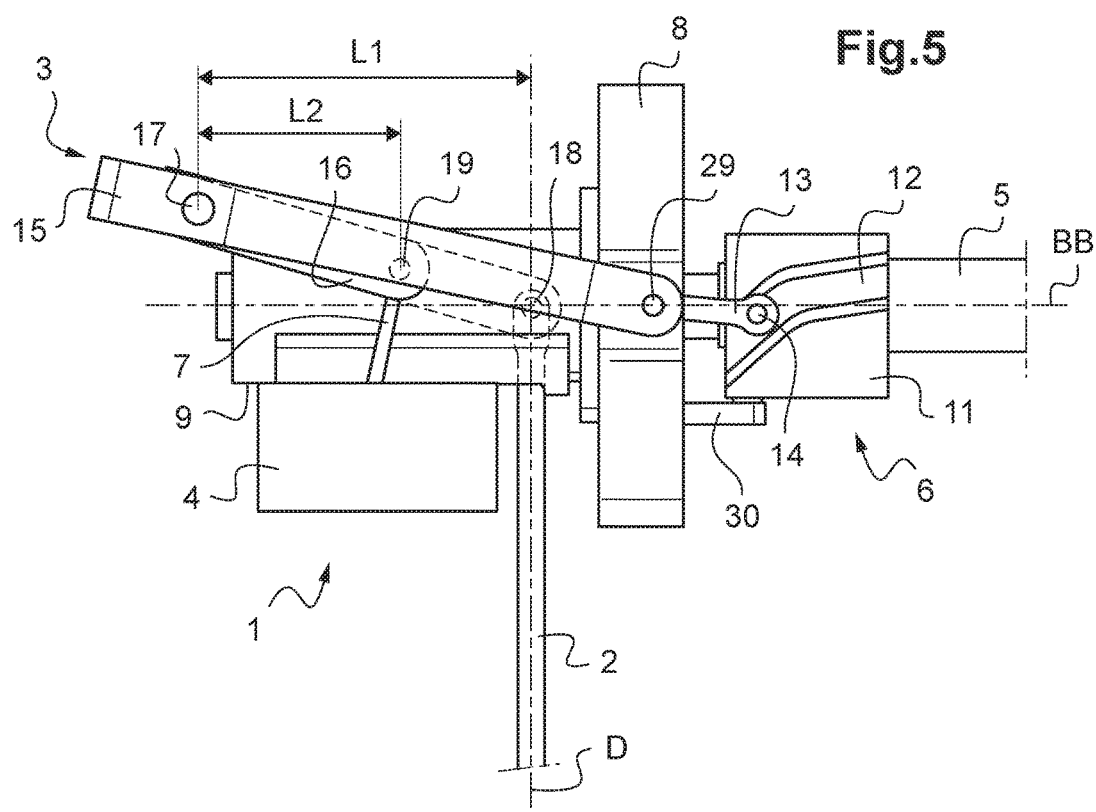
FIG. 5 is a plan view of the adaptive flight control system.
Figure 6:
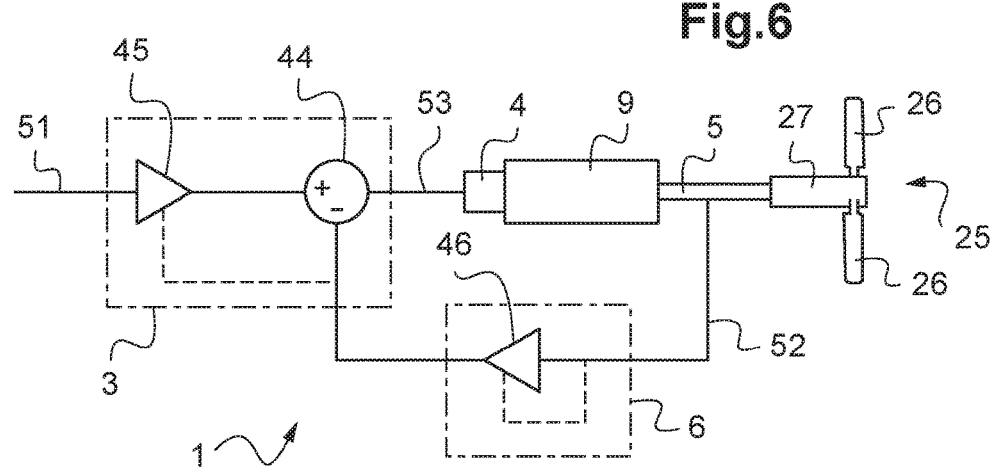
FIG. 6 is a block diagram showing the operation of the adaptive flight control system.

The hybrid helicopter 20 has two adaptive flight control systems 1 shown in detail in FIGS. 3 to 5, and operating in compliance with the block diagram given in FIG. 6. An adaptive flight control system 1 is positioned at one end of each of these two secondary mechanical linkages 36, more precisely between a secondary mechanical linkage 36 and a flight member 27 of a propulsive propeller 25.

FIGS. 3 and 4 are two perspective views of an adaptive flight control system 1 shown in two extreme positions of use. FIG. 5 is a plan view of the adaptive flight control system 1 for the extreme position shown in FIG. 4.

The adaptive flight control system 1 comprises control means 2, piloting means 3, action means 4, a piloting member 5, information return means 6, and a ring 8.

In FIG. 3, there can be seen the casing 10 of a propulsive propeller power transmission box 41. This casing 10 is fastened to the ring 8 of the adaptive flight control system 1. Together with the propulsive propeller power transmission box 41, the adaptive flight control system 1 forms a propulsive propeller power transmission system 40. In FIG. 3, the ring 8 and the casing 10 are shown as being transparent in order to facilitate understanding the operation of the adaptive flight control system 1. Likewise, in FIG. 4, the ring 8 is shown as being transparent.

The information return means 6 comprise transfer means 11 and a transfer link 13. The piloting means 3 comprise a control link 7, a first yoke 15 connected to the transfer link 13, and a second yoke 16 connected to the first yoke 15, to the control means 2, and to the control link 7.

The control means 2 comprise a tube extending along an axis D and constituted by the end of a secondary mechanical linkage 36. This secondary mechanical linkage 36 thus transmits an order to vary the pitch of the second blades 26 in the form of a first movement of the control means 2. This first movement is a movement in translation substantially parallel to the axis D.

This order to vary the pitch of the second blades 26 is delivered by a pilot of the hybrid helicopter 20 acting either on the rudder pedals 31 or on the thrust lever 33. This pitch variation order may also be delivered by an autopilot of the hybrid helicopter 20 acting directly on the two primary mechanical linkages 32 and 34.

Furthermore, a first pivot connection 17 connects together the first and second yokes 15 and 16. Likewise, the second yoke 16 is connected to the control means 2 by a second pivot connection 18 and to the control link 7 by a third pivot connection 19.

The first movement of the control means 2 causes the second yoke 16 to pivot about the axis CC of the first pivot connection 17 and causes a second movement of the control link 7 which then constitutes the setpoint for pitch variation of the second blades 26. This setpoint corresponds to the pitch variation order for the second blades 26, to which a control gain has been applied by the piloting means 3.

This control gain is defined by the shape of the piloting means 3. A first distance L1 between the first pivot connection 17 and the second pivot connection 18 defines a first lever arm perpendicular to the axis D, as shown in FIG. 5. Likewise, a second distance L2 between the first pivot connection 17 and the third pivot connection 19 defines a second lever arm perpendicular to the axis D. The control gain is then equal to the second distance L2 divided by the first distance L1.

The action means 4 receive this pitch variation setpoint for the second blades 26 via the second movement of the control link 7. The action means 4 transform this setpoint into an action of varying the pitch of the second blades 26 and it applies this action to the piloting member 5.

The piloting member 5 is a tube coaxial about the shaft for driving the second blades 26 of the propulsive propeller 25 in rotation and it serves to pilot the flight member 27 by movement in translation parallel to the axis BB. The flight member 27 thus modifies the pitch of the second blades 26 of a propulsive propeller 25 as a function of this movement in translation of the pilot member 5. This pilot member 5 may also driven in rotation about the axis BB by the drive shaft.

The action means 4 thus transform the second movement of the control link 7, i.e. the pitch variation setpoint for the second blades 26, into this movement in translation of the pilot member 5.

The movement in translation of this pilot member 5 may be controlled mechanically by the action means 4. The action means 4 then comprise a mechanical system for transforming the second movement of the control link 7 into a movement in translation that is transmitted to the pilot member 5, possibly via amplification means 9. When necessary, the amplification means 9 make it possible to deliver the power needed for moving the pilot member 5 in translation in order to modify the pitch of the second blades 26.

Movement in translation of the pilot member 5 may also be controlled hydraulically by the action means 4. The action means 4 then comprise a hydraulic system, e.g. a hydraulic distributor controlled by the control link 7 and powering the amplification means 9, then constituted by an actuator. The actuator then serves to move the piloting member 5 in translation.

The transfer means 11 of the information return means 6 are connected to the piloting member 5 by a first mechanical connection, with movement in translation of the piloting member 5 generating a third movement of the transfer means 11. In contrast, blocking means 30 prevent the rotation of the piloting member 5 being transmitted to the transfer means 11. The blocking means 30 are secured to the ring 8, which is stationary. As a result, the transfer means 11 possess only one degree of freedom to move, and that is in translation relative to the ring 8, with the third movement of the transfer means 11 being a movement in translation parallel to the axis BB. The piloting member 5 has two degrees of freedom to move relative to the ring 8, namely movement in translation parallel to the axis BB, and movement in pivoting about the axis BB.

The transfer means 11 are connected to the transfer link 13 by a second mechanical connection. The transfer means 11 include a groove 12, and the transfer link 13 has a peg 14 situated in the groove 12. This second mechanical connection is formed by the groove 12 and the peg 14, which can move in the groove 12. As a result, the third movement of the transfer means 11 causes the peg 14 to move in the groove 12, and consequently leads to a fourth movement of the transfer link 13.

This fourth movement of the transfer link 13 corresponds to information delivered by the information return means 6 concerning the position of the piloting member 5 and representative of the current value of the pitch of the second blades 26 of the propulsive propeller 25 as actually being applied by the flight member 27, and it is referred to herein as the "return value".

This groove 12 is made up of two straight-line segments of different slopes. By means of these two segments of different slopes, the information return means 6 apply variable return gain to the return value. This return gain is then proportional to the slope of the groove 12 and advantageously it is a position of the function of the peg 14 in the groove 12, and thus of the return value.

For example, it may be considered that the return gain is equal to one when the peg 14 is situated in a first slope of the groove 12, as shown in FIG. 3. This first position of the transfer means 11 corresponds to a small value for the collective pitch of the second blades 26, which is representative of low thrust or indeed zero thrust from the propulsive propeller 25.

This return gain is equal to six when the peg 14 is situated in a second slope of the groove 12, as shown in FIGS. 4 and 5. This second position of the transfer means 11 corresponds to a large value of the collective pitch of the second blades 26, representative of large thrust, or indeed maximum thrust, from the propulsive propeller 25.

Furthermore, the piloting member 5 and the information return means 6 are situated inside the casing 10 of a propulsive propeller power transmission box 41, as shown in FIG. 3. The information return means 6 are thus situated inside a zone that is full of oil. As a result, the information return means 6, and in particular the second mechanical connection formed by the groove 12 and the peg 14, are thus lubricated permanently.

The transfer link 13 is secured to the first yoke 15, so that the fourth movement of the transfer link 13 transmits a fifth movement to the first yoke 15. Furthermore, the transfer link 13 is connected to the ring 8 by a fourth pivot connection 29. The fourth movement of the transfer link 13 is a pivoting movement about the pivot axis AA of the fourth pivot connection 29, and consequently the fifth movement of the first yoke is likewise a pivoting movement about the pivot axis AA.

In addition, this fifth movement of the first yoke 15 causes the first pivot connection 17 to pivot about the pivot axis AA. Consequently, this pivoting of the first pivot connection 17 leads to a sixth movement of the second yoke 16.

This sixth movement of the second yoke 16 leads to an additional movement of the control link 7, which is combined with the second movement of the control link 7, thereby modifying the flight control setpoint, and thus regulating variation in the pitch of the second blades 26 of each propulsive propeller 25 via the action means 4 and the flight member 27.

This fifth movement of the first yoke 15 and this sixth movement of the second yoke 16 also leads to a reduction in the first and second distances L1 and L2, while the axis D remains unchanged. The control gain applied by the piloting means 3 to the flight control order is thus modified. This control gain is modified as a function of the return value.

Nevertheless, the variation in this control gain is small, in particular relative to variation in the return gain. This variation in the control gain is of the order of 5%, and thus negligible, with the angular movement of the first and second yokes 15 and 16 being of the order of ±30°.

Advantageously, the adaptive flight control system 1 acts as a function of the return value to modify both the return gain applied to the return value and also the control gain applied firstly to a first order from the rudder pedals 31 and secondly to a second order from the thrust lever 33 for the propulsive propellers 25. This return value which represents the current value of the pitch of the second blades 26 of the propulsive propellers 25 as actually being applied by the flight member 27, serves to define the thrust generated by each propulsive propeller 25, and thus constitutes a reliable and robust indicator of the speed of advance of the hybrid helicopter 20.

The block diagram shown in FIG. 6 serves to summarize the operation of the adaptive flight control system 1.

In the block diagram, the action means 4 pilot the amplification means 9 which drive the piloting member 5 so as to modify the pitch of the second blades 26 of a propulsive propeller 25 via the flight member 27.

The information return means 6 supply the return value 52 to the piloting means 3, which combine that value with the control order 51 in order to form the setpoint 53 for varying the pitch of the second blades 26.

The information return means 6 include first application means 46 for applying the return gain to the return value 52, this return gain being variable as a function of the return value 52 itself.

The piloting means 3 include second application means 45 for applying the control gain to the control order 51, this control gain being variable as a function of the return value 52. The piloting means 3 also include a subtracter 44 subtracting the return value 52 to which the return gain has been applied from the control order 51 to which the control gain has been applied. The output from the subtracter 44 constitutes the pitch variation setpoint 53 for the second blades 26 as supplied to the action means 4.

The adaptive flight control system 1 thus enables the pilot's authority over the rudder pedals 31 and the thrust lever 33 to be reduced considerably at high speeds of advance, thereby minimizing their effects on the behavior of the hybrid helicopter 20. Consequently, the hybrid helicopter 20 can fly more safely as a result of using the adaptive flight control system 1.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. An adaptive flight control system for an aircraft for modifying a gain applied to a return value of a flight control, the adaptive flight control system comprising:
   control means supplying a flight control order by a first movement of the control means;
   a piloting member for controlling a flight member of the aircraft;
   piloting means comprising a control link and applying a control gain in order to transform the flight control order into a flight control setpoint and transmitting the flight control setpoint to action means via a second movement of the control link;
   the action means transforming the flight control setpoint into a flight control action and applying the flight control action to the piloting member; and
   information return means supplying the piloting means with a return value for the flight control, the return value being a current value of the flight control as actually applied by the flight member;
   wherein the information return means varies a return gain applied to the return value of the flight control, the return gain being variable based on the return value of the flight control,
   wherein the information return means comprise transfer means and a transfer link applying the return gain to the return value of the flight control, the transfer means being connected to the piloting member by a first mechanical connection possessing at least one degree of freedom, the piloting member causing a third movement of the transfer means capable of leading to a fourth movement of the transfer link.

2. The adaptive flight control system according to claim 1, wherein the transfer means are provided with a groove and the transfer link is provided with a peg situated in the groove, the third movement of the transfer means leading to a movement of the peg in the groove and consequently possibly leading to the fourth movement of the transfer link, the movement of the peg in the groove possibly leading to a variation of the return gain.

3. The adaptive flight control system according to claim 1, wherein the transfer means moves only in translation.

4. The adaptive flight control system according to claim 1, wherein the piloting means apply the control gain to the flight control order, wherein the control gain is variable as based on the return value of the flight control.

5. The adaptive flight control system according to claim 4, wherein the piloting means comprise a first yoke connected to the information return means and a second yoke connected to the first yoke, to the control means, and to the control link, the information return means causing a fifth movement of the first yoke, the fifth movement of the first yoke causing a sixth movement of the second yoke and thereby modifying the control gain applied to the flight control order.

6. The adaptive flight control system according to claim 4, wherein the information return means comprise transfer means and the transfer link, the piloting means comprise a first yoke connected to the transfer link and a second yoke connected to the first yoke, to the control means, and to the control link, the fourth movement of the transfer link causing a fifth movement of the first yoke, the fifth movement of the first yoke causing a sixth movement of the second yoke, thereby modifying the control gain applied to the flight control order.

7. The adaptive flight control system according to claim 6, wherein the transfer link is secured to the first yoke, wherein the fourth movement of the transfer link and the fifth movement of the first yoke are pivoting movements about a common pivot axis (AA).

8. The adaptive flight control system according to claim 5, wherein the second yoke is connected to the first yoke by a first pivot connection, wherein the fifth movement of the first yoke causes a movement of the first pivot connection.

9. The adaptive flight control system according to claim 5, wherein the control means are connected to the second yoke by a second pivot connection, and the first movement of the control means causes the second yoke to pivot about a first pivot connection as a function of the flight control order.

10. A propulsive propeller power transmission system, the propulsive propeller power transmission system comprising an adaptive flight control system and a propulsive propeller power transmission box, and wherein the adaptive flight control system is a system according to claim 1.

11. The propulsive propeller power transmission system according to claim 10, wherein the information return means are situated inside the power transmission box of a propulsive propeller so that the information return means are lubricated permanently.

12. An aircraft including at least one flight member and at least one flight control and at least one flight control mechanical linkage in order to pilot the flight member, wherein the aircraft includes at least one propulsive propeller power transmission system according to claim 10 and positioned between the at least one flight control mechanical linkage and the flight member.

13. The aircraft according to claim 12, wherein the aircraft is a rotary wing aircraft comprising a fuselage, at least one main rotor provided with first blades, and at least two propulsive propellers positioned on either side of the fuselage and provided with second blades, each power transmission system of a propulsive propeller being positioned between the at least one mechanical linkage for controlling pitch of the second blades of the propulsive propellers and the propulsive propellers.

14. The aircraft according to claim 13, wherein a first flight control is constituted by rudder pedals for yaw flight control of the aircraft and controlling the pitch of the second blades of the propulsive propellers in differential manner, and a second flight control is a thrust lever for the propulsive propellers and controlling the pitch of the second blades of the propulsive propellers in identical manner, the first and second flight controls acting jointly on the control means of the adaptive flight control system of each power transmission system of a propulsive propeller.

15. An adaptive flight control system for an aircraft comprising:
   a first control linkage adapted to receive a flight control input, wherein the first control linkage supplies a first movement based on the flight control input;
   a piloting linkage assembly comprising:
      at least one yoke pivotally connected to the first control linkage;
      a control link pivotally connected to the yoke and the first control linkage, wherein the first movement of the first control linkage causes a second movement of the control link,
      wherein the piloting linkage assembly applies a control gain to transform the flight control input to a pitch variation setpoint based on the second movement;
   a mechanical system connected to the control link to receive the pitch variation setpoint via the second movement of the control link and configured to transform the pitch variation setpoint into a pitch control action;
a piloting link connected to the mechanical system and adapted to be connected to the second blades of propulsive propellers, wherein the piloting link receives the pitch control action from the mechanical system and moves to modify the pitch of the second blades;
an information return linkage connected to the piloting link and the piloting linkage assembly and providing a feedback to indicate a current pitch of the second blades and apply a variable return gain based on the current pitch, the information return linkage comprising:
 a transfer fitting connected to the piloting link and defining a groove;
 a transfer link having a peg moveable in the groove, the transfer link connected to the piloting linkage assembly,
wherein the return gain varies based on a position of the peg along the groove and applies additional movement of the control link, thereby modifying the control gain as a function of the current pitch of the second blades.

16. The adaptive flight control system according to claim 15, wherein the piloting link causes a third movement of the transfer fitting leading to a fourth movement of the transfer link,
wherein the at least one yoke comprises a first yoke and a second yoke, wherein the first yoke is connected to the information return linkage and the second yoke is connected to the first yoke, to the first control linkage, and to the control link, the information return linkage causing a fifth movement of the first yoke, the fifth movement of the first yoke causing a sixth movement of the second yoke and thereby modifying the control gain applied to the a pitch control action.

17. An adaptive flight control system for an aircraft comprising:
a first control linkage supplying a first movement based on a flight control input;
a control link connected to the first control linkage, wherein the first movement of the first control linkage causes a second movement of the control link, wherein the control link applies a control gain to transform the flight control input to a pitch variation setpoint based on the second movement;
a mechanical system connected to the control link to receive the pitch variation setpoint via the second movement of the control link and transform the pitch variation setpoint into a pitch control action;
a piloting link connected to the mechanical system and adapted to be connected to second blades of propulsive propellers, wherein the piloting link receives the pitch control action from the mechanical system and moves to modify the pitch of the second blades; and
an information return linkage connected to the piloting link and the control link,
wherein a position of the information return linkage indicates a current pitch of the second blades and applies a variable return gain via additional movement of the control link, thereby modifying the control gain as a function of the current pitch of the second blades.

18. The adaptive flight control system according to claim 17, wherein the information return linkage comprises a peg moveable in a groove, wherein the return gain varies as a function of a position of the peg along the groove.

19. The adaptive flight control system according to claim 18, wherein the groove has a first segment with a first slope and a second segment with a second slope different than the first slope, wherein the return gain varies based on the position of the peg in the groove along at least one of the first and second slopes.

20. The adaptive flight control system according to claim 17, when the piloting link comprises a piloting tube coaxial about a drive shaft for the propulsive propellers, wherein the piloting tube has two degrees of freedom in movement allowing movement in translation and in rotation.

* * * * *